(12) United States Patent
Xie et al.

(10) Patent No.: US 11,472,024 B2
(45) Date of Patent: Oct. 18, 2022

(54) HUMANOID ROBOT AND ITS CONTROL METHOD AND COMPUTER READABLE STORAGE MEDIUM

(71) Applicant: UBTECH ROBOTICS CORP LTD, Shenzhen (CN)

(72) Inventors: Yan Xie, Shenzhen (CN); Xiaozhu Ju, Shenzhen (CN); Mingguo Zhao, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 181 days.

(21) Appl. No.: 17/133,656

(22) Filed: Dec. 24, 2020

(65) Prior Publication Data
US 2021/0197367 A1    Jul. 1, 2021

(30) Foreign Application Priority Data
Dec. 28, 2019  (CN) .......................... 201911384199.1

(51) Int. Cl.
*B25J 9/16* (2006.01)
*B25J 13/08* (2006.01)
*B62D 57/02* (2006.01)

(52) U.S. Cl.
CPC .......... *B25J 9/1602* (2013.01); *B25J 9/1607* (2013.01); *B25J 13/085* (2013.01); *B25J 13/088* (2013.01); *B62D 57/02* (2013.01)

(58) Field of Classification Search
CPC ...... B62D 57/02; B62D 57/032; B25J 9/1602; B25J 13/088; B25J 13/085; B25J 9/1607; G05B 2219/40264
See application file for complete search history.

(56) References Cited

U.S. PATENT DOCUMENTS

| 8,457,830 B2 * | 6/2013 | Goulding | B62D 57/032 |
| | | | 700/258 |
| 8,532,824 B2 * | 9/2013 | Orita | B25J 9/1607 |
| | | | 700/250 |

* cited by examiner

*Primary Examiner* — Khoi H Tran
*Assistant Examiner* — Rodney P King

(57) ABSTRACT

The present disclosure provides a humanoid robot and its control method and computer readable storage medium. The method includes: obtaining a current torque of a sole of the humanoid robot, an inclination angle of the sole, an inclination angle of a first joint of the humanoid robot, and an inclination angle of a second joint of the humanoid robot; calculating current feedforward angular velocities of motors of the first and second joints through the obtained information; calculating feedback angular velocities of the motors of the first and second joints; and obtaining inclination angles of the joints based on the feedforward angular velocities of the motors and the feedback angular velocities of the motors, and performing, through the motor of the second joint, a deviation control on the joints according to the inclination angles of the joints.

20 Claims, 6 Drawing Sheets

HUMANOID ROBOT AND ITS CONTROL METHOD AND COMPUTER READABLE STORAGE MEDIUM

CROSS REFERENCE TO RELATED APPLICATIONS

The present disclosure claims priority to Chinese Patent Application No. 201911384199.1, filed Dec. 28, 2019, which is hereby incorporated by reference herein as if set forth in its entirety.

BACKGROUND

1. Technical Field

The present disclosure relates to humanoid robot technology, and particularly to a humanoid robot and its control method and computer readable storage medium.

2. Description of Related Art

Humanoid robots refer to robots designed to imitate the shape and behaviors of humans. A humanoid robot generally has a humanoid trunk and limbs, and are generally designed as different uses according to different application requirements, for example, industrial robotic arm, wheelchair robot, walking robots, and the like. The research of humanoid robots integrates multiple sciences such as mechanics, electronics, computers, materials, sensors, and control technologies.

Static balance control is an important topic in the research of humanoid robots, which directly effects the balance maintenance and balance recovery capabilities of humanoid robots in a standing and static state. When the humanoid robot is subject to external interference in a complex environment such as collisions, skidding, and uneven ground, maintaining stability and not falling is particularly important for the safety of the humanoid robot. The traditional static balance control method is to simplify the humanoid robot into an inverted pendulum model. When external interference acts, the IMU of the robot detects the inclination angle of the inverted pendulum in real time, and obtains the control angle of the inverted pendulum through closed-loop feedback control, and then uses a kinematics model to map the reference angle of the inverted pendulum to the angle of each joint, and finally realize the restoration of the centroid deviation.

However, the feedback of a feedback control device is controlled according to deviations, that is, under the effect of interference, the controlled quantity deviates from a given value first, and then the feedback control device produces a control effect according to the deviation to offset the influence of interference. The disadvantage of this method is that the feedback control device can only adjust the control quantity after the controlled quantity has a deviation, and the response of the device always lags behind the interference quantity, and theoretically cannot realize deviation control.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

The technical solutions in the embodiments of the present disclosure will be clearly and completely described below in conjunction with the drawings in the embodiments of the present disclosure. Apparently, the following embodiments are only part of the embodiments of the present disclosure, not all of the embodiments of the present disclosure. All other embodiments obtained by those skilled in the art without creative efforts are within the scope of the present disclosure.

Figure 1:
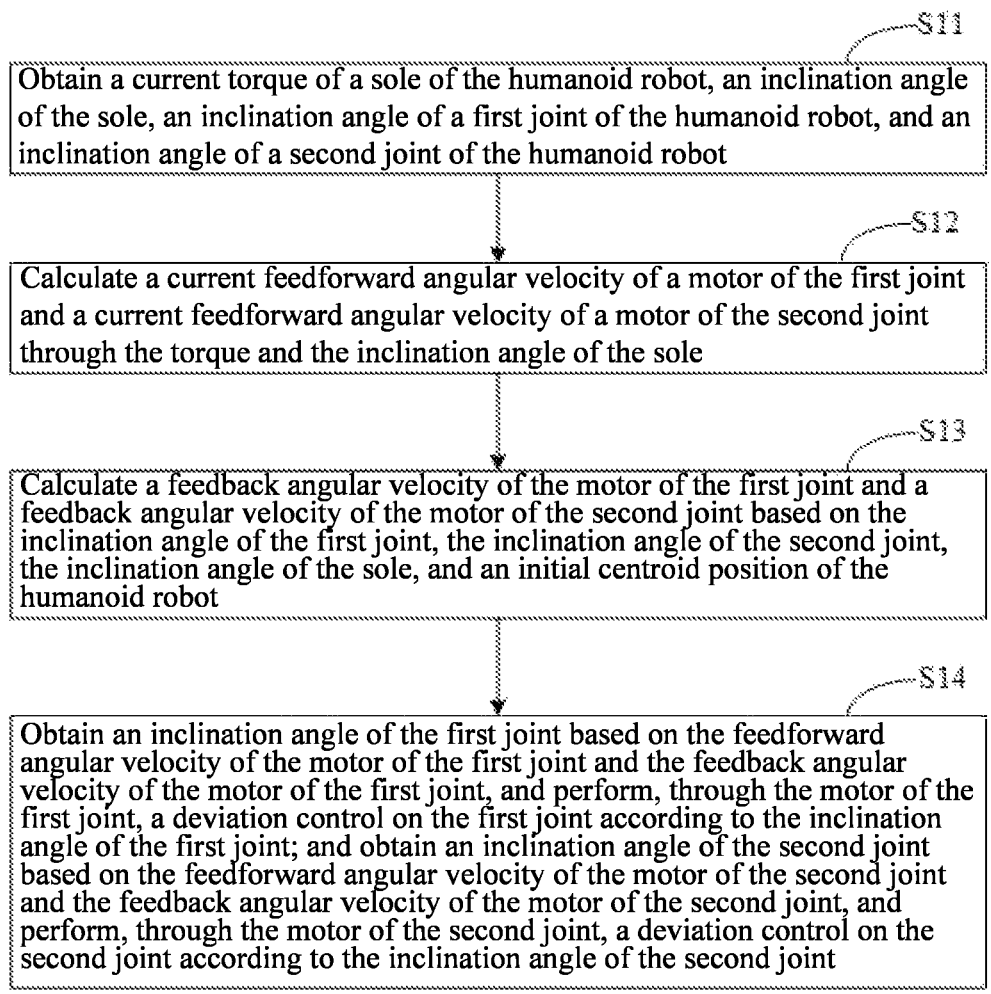
FIG. 1 is a flow chart of an embodiment of a humanoid robot control method according to the present disclosure.

FIG. 1 is a flow chart of an embodiment of a humanoid robot control method according to the present disclosure. In this embodiment, a control method for a humanoid robot is provided. The robot has an upper body and two legs, and each of the legs has at least a joint with a servo driven by a motor, where the movement of the legs is realized by the motor rotating an output shaft of the servo which is connected to the leg and upper body. The method is a computer-implemented method executable for a processor. In one embodiment, the method may be implemented through a robot humanoid shown in FIG. 5 or a computer readable storage medium shown in FIG. 6. As shown in FIG. 1, the method includes the following steps.

S11: obtaining a current torque of a sole of the humanoid robot, an inclination angle of the sole, an inclination angle of a first joint of the humanoid robot, and an inclination angle of a second joint of the humanoid robot.

Figure 3:
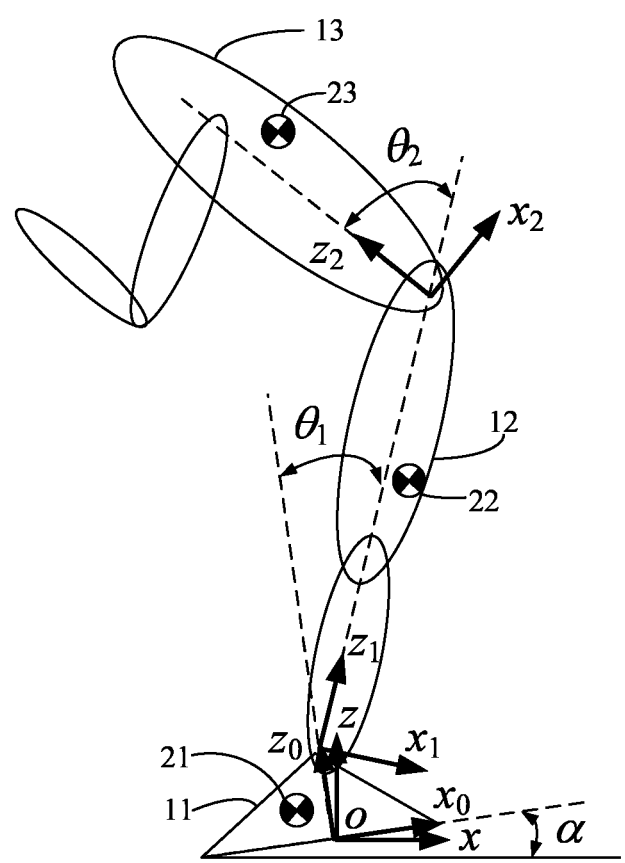
FIG. 3 is a schematic diagram of a humanoid robot in external interference according to an embodiment of the present disclosure.

In which, the inclination angle of the sole refers to an included angle between the sole and a plane, the inclination angle of the first joint refers to an included angle between a $z_0$-axis of a sole coordinate system and a $z_1$-axis of a leg coordinate system, and the inclination angle of the second joint refers to an included angle of the $z_1$-axis of the leg coordinate system and an $z_2$-axis of a upper body coordinate system (see FIG. 3). In this embodiment, a six-dimensional sensor installed on a sole of (a foot of) the leg of the humanoid robot collects a torque, that is, a sole torque, acting on the humanoid robot from the outside world. In which, the sensor outputs the torque as an analog signal, and the analog signal itself has certain fluctuations. Therefore, a signal threshold is set in this step, and it is determined whether the magnitude of the torque exceeds a signal threshold. If it does not exceed the signal threshold, it means that the humanoid robot has not been interfered by the outside world; otherwise, if the signal threshold is exceeded, it means that the humanoid robot has been disturbed by the outside world and needs to perform balance maintenance and balance restoration. Torque in physics refers to the tendency of a force to make an object to rotate around a rotational axis or fulcrum. The unit of torque is Newton× meter, and the torque can make the object to change its rotational state. The torque is equal to the cross product of the radial vector and the force.

In this step, the current sole torque of the humanoid robot is collected through the six-dimensional sensor installed on the sole of (a foot of) the leg of the humanoid robot. When the sole torque exceeds the signal threshold, it is determined that the humanoid robot has subject to external interference, and further obtains the current inclination angle of the first joint and the current inclination angle of the second joint through the encoders of the motor of the first joint and the motor of the second joint, and obtains the current inclination angle of the sole based on the difference between the inclination angle of the upper body that is detected by an IMU (inertial measurement unit) disposed on the upper body of the humanoid robot and the current inclination angles of the first and second joints.

S12: calculating a current feedforward angular velocity of a motor of the first joint and a current feedforward angular velocity of a motor of the second joint through the torque and the inclination angle of the sole.

An external torque is inputted into an admittance controller to convert the torque into an angle that can be recognized by the motor of the joints. The core of the admittance controller is for calculating a reference trajectory based on an output interaction force and a self-defined impedance spring model. Therefore, in this step, it first inputs the sole torque into the admittance controller to obtain the feedforward angle of the motor of the first joint, and further obtains the feedforward angular velocity of the motor of the first joint based on an initial angle of the first motor.

After obtaining the feedforward angular velocity of the motor of the first joint, the inclination angle of the first joint and the inclination angle of the second joint of the humanoid robot at the previous moment are obtained (the inclination angle at the previous moment is the final calculation result at the previous moment which can be obtained directly), and a centroid motion parameter, that is, a centroid kinematics model, is calculated based on the inclination angle of the sole and the inclination angle of the first joint and the inclination angle of the second joint at the previous moment. The derivation of the inclination angle of the sole is calculated to obtain an angular velocity corresponding to the inclination angle of the sole, a relation between the feedforward angular velocity of the motor of the first joint and the feedforward angular velocity of the motor of the second joint is determined based on the centroid motion parameter, the angular velocity corresponding to the inclination angle of the sole, and a coordinate parameter of a centroid of the humanoid robot in a first coordinate system, and the feedforward angular velocity of the motor of the second joint is further obtained according to the obtained feedforward angular velocity of the motor of the first joint and the above-mentioned relation. In which, the first coordinate system refers to a plane global coordinate system with a total centroid taking an initial plane as the x axis and the normal direction of the x axis as the z axis when the humanoid robot is put on the initial plane. At this time, both the feedforward angular velocity of the motor of the first joint and the feedforward angular velocity of the motor of the second joint in the feedforward control have been obtained.

S13: calculating a feedback angular velocity of the motor of the first joint and a feedback angular velocity of the motor of the second joint based on the inclination angle of the first joint, the inclination angle of the second joint, the inclination angle of the sole, and an initial centroid position of the humanoid robot.

The current actual position of the centroid is calculated according to the inclination angle of the first joint, the inclination angle of the second joint, and the inclination angle of the sole, and the deviation of the centroid of the humanoid robot is calculated based on the difference between the current actual position of the centroid and a preset initial centroid position of the humanoid robot, and then a closed-loop feedback is performed on the centroid deviation of the humanoid robot through a common controller (e.g., a PID controller, a PD controller, a PI controller, or a P controller,) to obtain the feedback speed of the centroid, and finally the feedback angular velocity of the motor of the first joint and the feedback angular velocity of the motor of the second joint are determined through the product of the feedback speed of the centroid and the motion parameter of the centroid.

S14: obtaining an inclination angle of the first joint based on the feedforward angular velocity of the motor of the first joint and the feedback angular velocity of the motor of the first joint, and performing, through the motor of the first joint, a deviation control on the first joint according to the inclination angle of the first joint; and obtaining an inclination angle of the second joint based on the feedforward angular velocity of the motor of the second joint and the feedback angular velocity of the motor of the second joint, and performing, through the motor of the second joint, a deviation control on the second joint according to the inclination angle of the second joint.

By summing the feedforward angular velocity of the motor of the first joint and the feedback angular velocity of the motor of the first joint obtained in the above-mentioned two steps (i.e., steps S13 and S14), a reference angular velocity of the motor of the first joint is obtained, and the reference angular velocity of the motor of the first joint is integrated, and finally the inclination angle of the first joint is obtained, which is the current inclination angle of the first joint to be transmitted to the motor of the first joint so that the motor of the first joint can perform the deviation control on the first joint according to the inclination angle of the first joint.

At the same time, by summing the feedforward angular velocity of the motor of the second joint and the feedback angular velocity of the motor of the second joint obtained in the above-mentioned two steps (i.e., steps S13 and S14), a reference angular velocity of the motor of the second joint is obtained, and the reference angular velocity of the motor of the second joint is integrated, and finally the inclination angle of the second joint is obtained, which is the current inclination angle of the second joint to be transmitted to the motor of the second joint so that the motor of the second joint can perform the deviation control on the second joint according to the inclination angle of the second joint. Finally, the motors of the two joints are controlled to perform compensation and deviation control on the two joints, and finally the humanoid robot can be restored to balance.

In the above-mentioned manner, the feedforward angular velocity of each joint motor under feedforward control is calculated first, and the feedback angular velocity of each joint motor under feedback control is calculated, and then the feedforward angular velocities and the feedback angular velocities calculated through the above-mentioned two control methods are summed and integrated, and finally the reference angles that combine the results of feedforward control and feedback control which makes the humanoid robot to be restored to balance are obtained, which effectively solves the problem of response lag in feedback control and improves the control accuracy of each motor while ensuring the accuracy of centroid control, and improves the balance and anti-interference capabilities of the humanoid robot.

Figure 2:
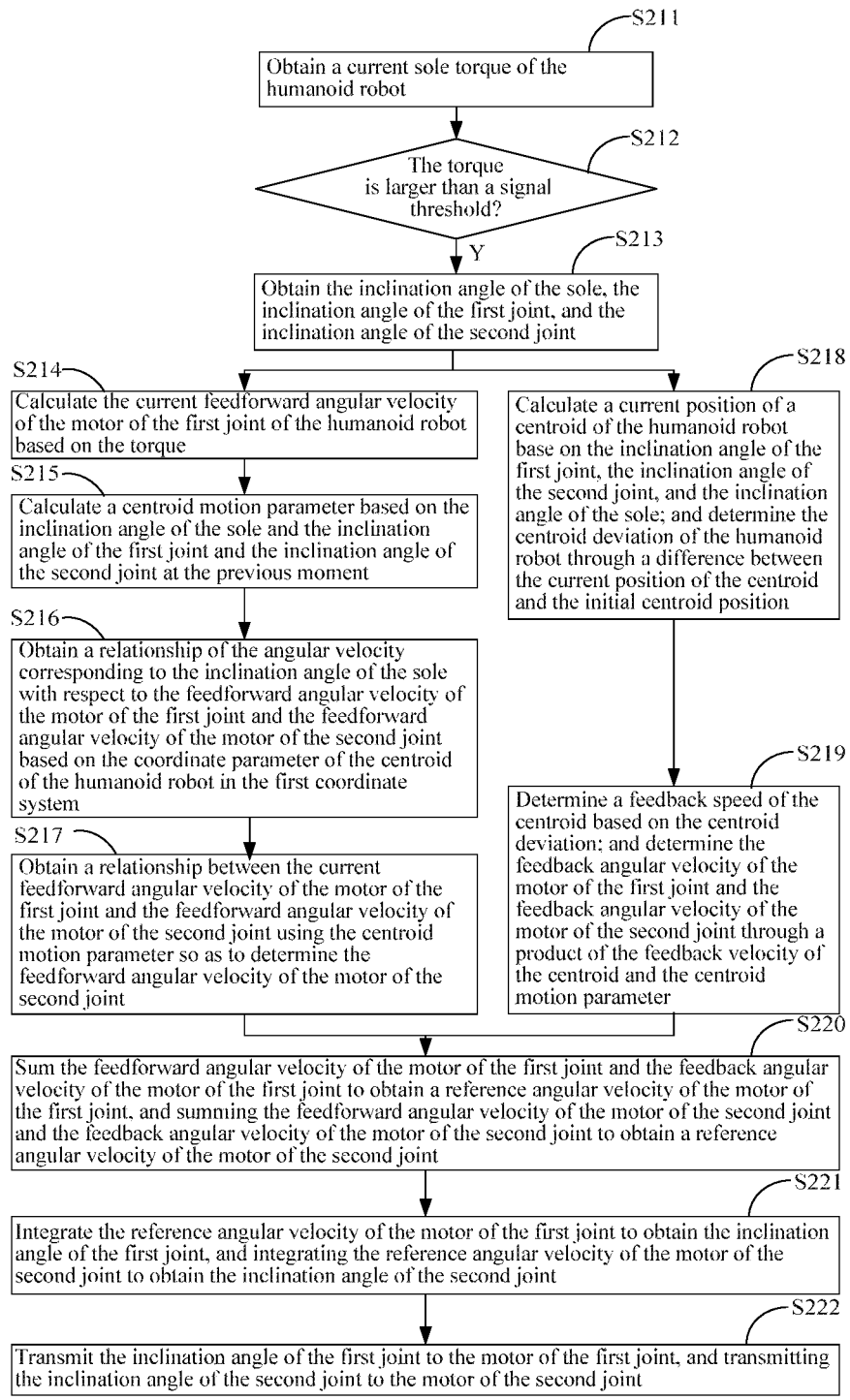
FIG. 2 is a flow chart of another embodiment of a humanoid robot control method according to the present disclosure.

FIG. 2 is a flow chart of another embodiment of a humanoid robot control method according to the present disclosure. In which, steps S214-S217 represent the calculation process of a feedforward instruction in the control method, and steps S218-S219 represent the calculation process of a feedback instruction in the control method. Steps S214-S217 and steps S218-S219 will be executed in each control cycle in the order that steps S214-S217 first or steps S218-S219 first. As shown in FIG. 2, another humanoid robot control method is provided.

In this embodiment, the humanoid robot can be divided into three masses of a three-mass model, namely the foot, the leg, and the upper body. In which, the joint between the foot and the leg is the first joint, and the joint between the leg and the upper body is the second joint, where the first joint is an ankle joint and the second joint is a hip joint.

S211: obtaining a current sole torque of the humanoid robot.

In this embodiment, a six-dimensional sensor installed on a sole of (a foot of) the leg of the humanoid robot collects a torque, that is, a sole torque, acting on the humanoid robot from the outside world. In which, torque in physics refers to the tendency of a force to make an object to rotate around a rotational axis or fulcrum. The unit of torque is Newton× meter, and the torque can make an object to change its rotational state. The torque is equal to the cross product of the radial vector and the force.

S212: determining whether the torque is larger than a signal threshold.

The sensor outputs the collected torque as a kind of analog signal, and the analog signal itself has certain fluctuations. Therefore, the signal threshold is set in this step, and it is determined whether the magnitude of the torque exceeds a signal threshold. If it does not exceed the signal threshold, it means that the humanoid robot has not been interfered by the outside world, and no processing will be made; otherwise, if the signal threshold is exceeded, it means that the humanoid robot has been disturbed by the outside world and needs to perform balance maintenance and balance restoration. Torque in physics refers to the tendency of a force to make an object to rotate around a rotational axis or fulcrum. The unit of torque is Newton×meter, and the torque can make the object to change its rotational state. The torque is equal to the cross product of the radial vector and the force.

S213: obtaining the inclination angle of the sole, the inclination angle of the first joint, and the inclination angle of the second joint.

When it is determined in the previous step that the torque is larger than the signal threshold, the current inclination angle of the first joint and the current inclination angle of the second joint of the humanoid robot are obtained through the encoders of the motor of the first joint and the motor of the second joint, and the current inclination angle of the sole is obtained based on the difference between the inclination angle of the upper body that is detected by the IMU disposed on the upper body of the humanoid robot and the current inclination angles of the first and second joints using the formula as follows:

$$\theta_{IMU} = \tilde{\theta}_2 + \tilde{\theta}_1 + \alpha \quad (1)$$

where, $\theta_{IMU}$ is the inclination angle of the upper body that is detected by the IMU, $\tilde{\theta}_1$ is the inclination angle of the first joint, $\tilde{\theta}_2$ is the inclination angle of the second joint, and $\alpha$ is the inclination angle of the sole. Therefore, the inclination angle $\alpha$ of the sole can be obtained by subtracting the inclination angle $\tilde{\theta}_1$ of the first joint and the inclination angle $\tilde{\theta}_2$ of the second joint from the inclination angle $\theta_{IMU}$ of the upper body.

S214: calculating the current feedforward angular velocity of the motor of the first joint of the humanoid robot based on the torque.

An external torque is inputted into the admittance controller (the core of the admittance controller is for calculating a reference trajectory based on an output interaction force and a self-defined impedance spring model) to convert the torque into an angle that can be recognized by a position-controlled motor, and the angle is set as the feedforward angle of the motor of the first joint. In this embodiment, the motor of the first joint and the motor of the second joint are both position-controlled motors. The feedforward angle of the motor of the first joint can be calculated using the formula as follows:

$$\tau_y = M(\ddot{\theta}_1^{Feedforward} - {}^{ref}\ddot{\theta}_1) + C(\dot{\theta}_1^{Feedforward} - {}^{ref}\dot{\theta}_1) + K(\theta_1^{Feedforward} - {}^{ref}\theta_1) \quad (2)$$

where, ${}^{ref}\theta_1$ is the initial angle of the motor of the first joint of the humanoid robot, ${}^{ref}\dot{\theta}_1$ is the initial angular velocity of the motor of the first joint of the humanoid robot, ${}^{ref}\ddot{\theta}_1$ is the initial angular acceleration of the motor of the first joint of the humanoid robot; $\theta_1^{Feedforward}$ is the feedforward angle of the motor of the first joint of the humanoid robot, $\dot{\theta}_1^{Feedforward}$ is the feedforward angular velocity of the motor of the first joint of the humanoid robot, $\ddot{\theta}_1^{Feedforward}$ is the feedforward angular acceleration of the motor of the first joint of the humanoid robot; $\tau_y$ is the torque detected by the six-dimensional force sensor installed on the sole; and M, C and K represent three parameters of the admittance controller, which can be manually adjusted according to actual needs.

Through the above-mentioned formula and the calculation relationship between the feedforward angular acceleration of the motor of the first joint, the feedforward angle of the motor of the first joint, and the feedforward angular velocity of the motor of the first joint, the feedforward angular acceleration, the feedforward angle, and the feedforward angular velocity of the motor of the first joint are obtained.

S215: calculating a centroid motion parameter based on the inclination angle of the sole and the inclination angle of the first joint and the inclination angle of the second joint at the previous moment.

In this embodiment, the humanoid robot is abstracted as a three-mass model. FIG. 3 is a schematic diagram of a humanoid robot in external interference according to an embodiment of the present disclosure; and FIG. 4 is a schematic diagram of a three-mass model of a humanoid robot according to an embodiment of the present disclosure.

Figure 4:
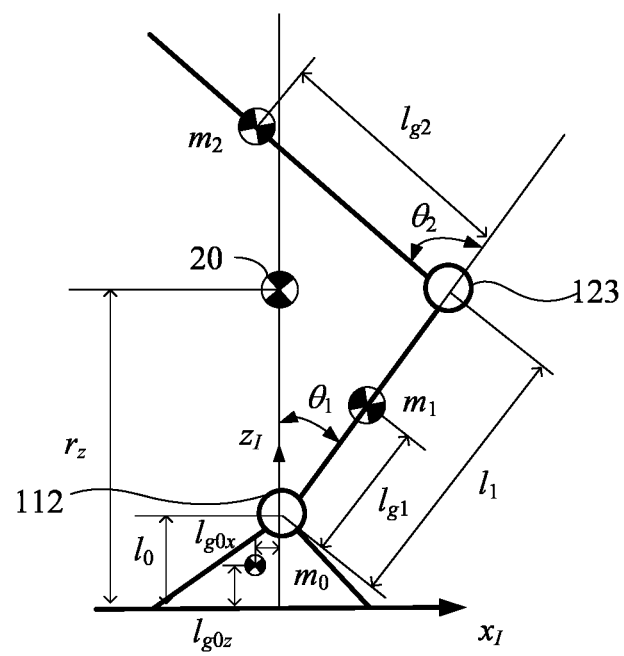
FIG. 4 is a schematic diagram of a three-mass model of a humanoid robot according to an embodiment of the present disclosure.

As shown in FIG. 3 and FIG. 4, a humanoid robot includes a foot 11, a leg 12, an upper body 13, a first joint 112, and a second joint 123. In which, the foot 11 includes a foot centroid 21, the leg 12 includes a leg centroid 22, the upper body 13 includes an upper body centroid 23, and the humanoid robot includes a total centroid 20.

As shown in FIG. 3, there are a total of 4 coordinate systems in the three-mass model. The first coordinate system is a global coordinate system o-xyz, which is formed by taking the direction of the initial plane on which the humanoid robot standing as the x-axis and the normal direction of the initial plane as the z-axis. The second coordinate system is a foot coordinate system $o\text{-}x_0y_0z_0$, which is formed by taking the direction of the bottom of the sole of the humanoid robot as the $x_0$ axis and the normal direction of the bottom of the sole as the $z_0$ direction. The third coordinate system is a leg coordinate system $o\text{-}x_1y_1z_1$, which is formed by taking the line connecting the first joint 112 and the second joint 123 as the $z_1$ direction, where the leg centroid 22 is also on the line. The fourth coordinate system is an upper body coordinate system $o\text{-}x_2y_2z_2$, which is formed by taking the line between the second joint 123 and the upper body centroid 23 as the $z_2$ axis.

The centroid motion parameter is calculated based on the inclination angle of the sole and the inclination angle of the first joint and the inclination angle of the second joint at the previous moment.

The centroid motion parameter $[H_{fl}]$ of the humanoid robot is the component of the Jacobian matrix of the centroid of the humanoid robot, and its value is related to the mass of the robot, the structure size and the inclination angles of the motor of the first joint and the motor of the second joint, which can be calculated using the formula as follows:

$$[H_{fl}] = \left[ K \frac{m_2 l_{g2} \cos(\theta_1 + \theta_2 + \alpha)}{m_0 + m_1 + m_2} \right] \quad (3)$$

in which, $$K = \frac{m_1 l_{g1} \cos\theta_1 + m_2(l_1 \cos\theta_1 + l_{g2} \cos(\theta_1 + \theta_2))}{m_0 + m_1 + m_2} \cos\alpha - \frac{m_1 l_{g1} \sin\theta_1 + m_2(l_1 \sin\theta_1 + l_{g2} \sin(\theta_1 + \theta_2))}{m_0 + m_1 + m_2} \sin\alpha \quad (4)$$

where, $\theta_1$ and $\theta_2$ represent the inclination angle of the first joint and the inclination angle of the second joint at the previous moment, respectively; $m_0$, $m_1$ and $m_2$ represent the mass of the foot 11, the mass of the leg 12, and the mass of the upper body 13 of the humanoid robot, respectively; $l_{g1}$ represents the position of the leg centroid 22 in the leg coordinate system $o\text{-}x_1y_1z_1$; $l_{g2}$ represents the position of the upper body centroid 23 in the upper body coordinate system $o\text{-}x_2y_2z_2$; $l_0$ represents the position of the first joint 112 in the foot coordinate system $o\text{-}x_0y_0z_0$; and $l_1$ represents the position of the second joint 123 in the leg coordinate system $o\text{-}x_1y_1z_1$.

The centroid motion parameter $[H_{fl}]$, that is, the kinematics model of the centroid is obtained through the above-mentioned two formulas (i.e., formulas (3) and (4)).

S216: obtaining a relationship of the angular velocity corresponding to the inclination angle of the sole with respect to the feedforward angular velocity of the motor of the first joint and the feedforward angular velocity of the motor of the second joint based on the coordinate parameter of the centroid of the humanoid robot in the first coordinate system.

Furthermore, the coordinate of the total centroid 20 of the humanoid robot is expressed in the global coordinate system $o\text{-}xyz$ as:

$$\begin{bmatrix} D_x \\ D_z \end{bmatrix} = \begin{bmatrix} \cos\alpha & \sin\alpha \\ -\sin\alpha & \cos\alpha \end{bmatrix} \begin{bmatrix} d_x \\ d_z \end{bmatrix} \quad (5)$$

where, $D_x$ is the horizontal projection component of the total centroid 20 in the global coordinate system $o\text{-}xyz$, $D_z$ is the vertical projection component of the total centroid 20 in the global coordinate system $o\text{-}xyz$, $\alpha$ is the inclination angle of the sole, and $d_x$ and $d_z$ are the projection components of the total centroid 20 of the three-mass model in the local coordinate system $o\text{-}x_0y_0z_0$ which are expressed as:

$$d_x = \frac{m_1 l_{g1} \sin\theta_1 + m_2(l_1 \sin\theta_1 + l_{g2} \sin(\theta_1 + \theta_2)) + m_0 l_{g0x}}{m_0 + m_1 + m_2} \quad (6)$$

$$d_z = \frac{m_1(l_0 + l_{g1} \cos\theta_1) + m_2(l_0 + l_1 \cos\theta_1 + l_{g2} \cos(\theta_1 + \theta_2)) + m_0 l_{g0z}}{m_0 + m_1 + m_2}$$

where, $l_{g0x}$ and $l_{g0z}$ represent the projection components of the foot centroid in the foot coordinate system $o\text{-}x_0y_0z_0$.

By calculating the derivation of formula (5), the relationship between the total centroid velocity and the angular velocity of each joint and the angular velocity of the inclination angle of the sole can be obtained. At the same time, supposing that the horizontal velocity of the total centroid is zero, then the relation between the angular velocity of each joint and the angular velocity of the inclination angle of the sole can be further obtained:

$$[H_{fl}] \begin{bmatrix} \dot{\theta}_1 \\ \dot{\theta}_2 \end{bmatrix} = -D_x \dot{\alpha} \quad (7)$$

where, $[H_{fl}]$ is the centroid motion parameter of the humanoid robot, $\dot{\theta}_1$ is the current feedforward angular velocity of the motor of the first joint, $\dot{\theta}_2$ is the current feedforward angular velocity of the motor of the second joint, and $\dot{\alpha}$ is the angular velocity corresponding to the inclination angle of the sole. In which, $\dot{\alpha}$ is obtained by calculating the derivation of formula (1) to obtain formula (8) and then further calculating the difference.

$$\dot{\theta}_{IMU} = \tilde{\dot{\theta}}_2 + \tilde{\dot{\theta}}_1 + \dot{\alpha} \quad (8)$$

where, $\dot{\theta}_{IMU}$ is the inclination angular velocity detected by the IMU, $\tilde{\dot{\theta}}_1$ is the current inclination angular velocity of the first joint, and $\tilde{\dot{\theta}}_2$ is the current inclination angular velocity of the second joint.

S217: obtaining a relationship between the current feedforward angular velocity of the motor of the first joint and the feedforward angular velocity of the motor of the second joint using the centroid motion parameter so as to determine the feedforward angular velocity of the motor of the second joint.

Substituting formula (4) into formula (3), and then substituting formula (3) into formula (7) so as to obtain formula (9):

$$\begin{bmatrix} \dot{\theta}_1 \\ \dot{\theta}_2 \end{bmatrix} = -[H_{fl}]^+ D_x \dot{\alpha} + (I - [H_{fl}]^+ [H_{fl}]) \xi_1 \quad (9)$$

where, $[H_{fl}]^+$ is the generalized inverse matrix of matrix $[H_{fl}]$, which can be obtained through SVD (singular value decomposition, an important matrix decomposition method in linear algebra), and I is an identity matrix. Through formula (9), the feedforward control law corresponding to the constant state of the total centroid, that is, the relation between the angular velocity of the motor of the first joint and the angular velocity of the motor of the second joint, can be obtained. Based on formula (9) and the first joint feedforward angular velocity obtained in the above-mentioned steps, the feedforward angular velocity of the motor of the second joint can be obtained.

S218: calculating a current position of a centroid of the humanoid robot base on the inclination angle of the first joint, the inclination angle of the second joint, and the inclination angle of the sole; and determining the centroid deviation of the humanoid robot through a difference between the current position of the centroid and the initial centroid position.

The current position of the centroid is calculated according to the inclination angle of the first joint, the inclination angle of the second joint and the inclination angle of the sole using the formula as follows:

$$\tilde{D}_x = \tilde{d}_x \cos \alpha + \tilde{d}_z \sin \alpha \quad (10)$$

where, $\tilde{D}_x$ represents the actual projection of the total centroid in the horizontal direction of the global coordinate system o-xyz, $\tilde{d}_x$ and $\tilde{d}_z$ represents the actual projection of the total centroid of the horizontal and vertical directions in the local coordinate system $o\text{-}x_0 y_0 z_0$, respectively, and their expression is as shown in equation (6). When solving $\tilde{d}_x$ and $\tilde{d}_z$, the joint angle in equation (6) should be replaced with the inclination angle $\tilde{\theta}_1$ of the first joint and the inclination angle $\tilde{\theta}_2$ of the second joint accordingly.

Suppose the horizontal position of the total centroid in an initial standing state, then the deviation of the horizontal position of the total centroid is:

$$D_{err} = D_{ini} - \tilde{D}_x \quad (11)$$

at this time, the deviation $D_{err}$ of the horizontal position of the total centroid is obtained.

S219: determining a feedback speed of the centroid based on the centroid deviation; and determining the feedback angular velocity of the motor of the first joint and the feedback angular velocity of the motor of the second joint through a product of the feedback velocity of the centroid and the centroid motion parameter.

Close-loop feedback is performed on the horizontal positional deviation of the centroid to obtain a feedback speed instruction of the centroid. Herein, the common PID controller, PD controller, PI controller, or P controller can be used for closed-loop feedback. Taking the PI controller as an example, the form of its outputted feedback instruction is as follows:

$$Y(t) = K_p D_{err} + \frac{K_i}{T} \int (D_{err}) dt \quad (12)$$

where, $K_p$ is the proportional coefficient for controlling the response speed, $K_i$ is the integral coefficient for controlling the steady-state accuracy, and T is the control period. In practical applications, the two parameters $K_p$ and $K_i$ can be manually adjusted according to actual needs.

The feedback angular velocities of the motor of the first joint and the motor of the second joint are obtained based on the product of the generalized inverse matrix $[H_{fl}]^+$ of the motion parameters of the centroid and the above-mentioned feedback instruction Y(t) using the formula as follows:

$$\begin{bmatrix} \dot{\theta}_1^{Feedback} \\ \dot{\theta}_2^{Feedback} \end{bmatrix} = [H_{fl}]^+ Y(t) \quad (13)$$

Where, $\dot{\theta}_1^{Feedback}$ is the feedback angular velocity of the motor of the first joint, and $\dot{\theta}_2^{Feedback}$ is the feedback angular velocity of the motor of the second joint.

S220: summing the feedforward angular velocity of the motor of the first joint and the feedback angular velocity of the motor of the first joint to obtain a reference angular velocity of the motor of the first joint, and summing the feedforward angular velocity of the motor of the second joint and the feedback angular velocity of the motor of the second joint to obtain a reference angular velocity of the motor of the second joint.

The step S220 of summing the feedforward angular velocity of the motor of the first joint and the feedback angular velocity of the motor of the first joint to obtain a reference angular velocity of the motor of the first joint, and summing the feedforward angular velocity of the motor of the second joint and the feedback angular velocity of the motor of the second joint to obtain a reference angular velocity of the motor of the second joint is to add the formula on the right of the equal sign of formula (13) and the formula on the right of the equal sign of formula (9) to obtain the reference angular velocities of the motor of the first joint and the motor of the second joint. In which, formula (9) is an equation, $-[H_{fl}]^+ D_x \dot{\alpha}$ on the right of the equal sign is the special solution of the equation, $(I-[H_{fl}]^+[H_{fl}]) \xi_1$ is the general solution of the equation, and the calculation of formula (9) is performed under the condition that the horizontal velocity of the total centroid is zero. Hence, when calculating, the right of formula (9) has only the general solution. When the special solution on the right of the equal sign of formula (13) is added to the general solution, the property of the right of the equal sign of the entire formula remains unchanged, and it is still the composition of the special solution and the general solution. Therefore, even if the feedforward angular velocity and the feedback angular velocity are added, the property of the angular velocity will not change, but a reference angular velocity that combines the feedforward angular velocity and the feedback angular velocity is formed.

S221: integrating the reference angular velocity of the motor of the first joint to obtain the inclination angle of the first joint, and integrating the reference angular velocity of the motor of the second joint to obtain the inclination angle of the second joint.

In step S221 of integrating the reference angular velocity of the motor of the first joint to obtain the inclination angle of the first joint, and integrating the reference angular velocity of the motor of the second joint to obtain the inclination angle of the second joint, the integration can adopt bilinear transformation, forward difference, backward difference, or the like.

S222: transmitting the inclination angle of the first joint to the motor of the first joint, and transmitting the inclination angle of the second joint to the motor of the second joint.

The inclination angle of the first joint is transmitted to the motor of the first joint, and the inclination angle of the second joint is transmitted to the motor of the second joint, so that the motor of the first joint and the motor of the second joint can perform compensation and deviation control according to their respective inclination angles, and finally the humanoid robot can be restored to balance.

In the above-mentioned manner, the feedforward angular velocity of each joint motor under feedforward control is calculated first, and the feedback angular velocity of each joint motor under feedback control is calculated, and then the feedforward angular velocities and the feedback angular velocities calculated through the above-mentioned two control methods are summed and integrated, and finally the reference angles that combine the results of feedforward control and feedback control are obtained, which effectively solves the problem of response lag in feedback control and improves the control accuracy of each motor while ensuring the accuracy of centroid control, and improves the balance and anti-interference capabilities of the humanoid robot.

Figure 5:
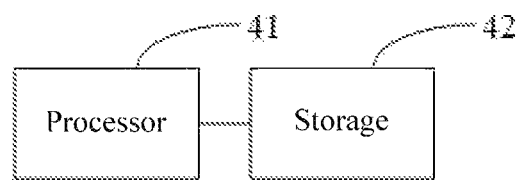
FIG. 5 is a schematic block diagram of a humanoid robot according to an embodiment of the present disclosure.

Based on the same inventive concept, a humanoid robot that can realize the humanoid robot control method of any of the above-mentioned embodiments is further provided. FIG. 5 is a schematic block diagram of a humanoid robot according to an embodiment of the present disclosure. As shown in FIG. 5, a humanoid robot includes a processor 41 and a storage 42, and sensor(s) (e.g., an IMU and a six-dimensional sensor).

The storage 42 is configured to store an inclination angle of the first joint, an inclination angle of the second joint, and an inclination angle of the sole.

The processor 41 is configured to collect a torque, that is, a sole torque, acting on the humanoid robot from the outside world through a six-dimensional sensor installed on a sole of the leg of the humanoid robot. The current sole torque of the humanoid robot is collected through the six-dimensional sensor installed on the sole of the leg of the humanoid robot. When the sole torque exceeds the signal threshold, it is determined that the humanoid robot has subject to external interference, and further obtains the current inclination angle of the first joint and the current inclination angle of the second joint through the encoders of the motor of the first joint and the motor of the second joint, and obtains the current inclination angle of the sole based on the difference between the inclination angle of the upper body that is detected by an IMU disposed on the upper body of the humanoid robot and the current inclination angles of the first and second joints.

The processor 41 is further configured to input an external torque into an admittance controller to convert the torque into an angle that can be recognized by the motor of the joints. The core of the admittance controller is for calculating a reference trajectory based on an output interaction force and a self-defined impedance spring model. Therefore, in this step, it first inputs the sole torque into the admittance controller to obtain the feedforward angle of the motor of the first joint, and further obtains the feedforward angular velocity of the motor of the first joint based on an initial angle of the first motor.

After obtaining the feedforward angular velocity of the motor of the first joint, the inclination angle of the first joint and the inclination angle of the second joint of the humanoid robot at the previous moment are obtained (the inclination angle at the previous moment is the final calculation result at the previous moment which can be obtained directly), and a centroid motion parameter, that is, a centroid kinematics model, is calculated based on the inclination angle of the sole and the inclination angle of the first joint and the inclination angle of the second joint at the previous moment. The derivation of the inclination angle of the sole is calculated to obtain an angular velocity corresponding to the inclination angle of the sole, a relation between the feedforward angular velocity of the motor of the first joint and the feedforward angular velocity of the motor of the second joint is determined based on the centroid motion parameter, the angular velocity corresponding to the inclination angle of the sole, and a coordinate parameter of a centroid of the humanoid robot in a first coordinate system, and the feedforward angular velocity of the motor of the second joint is further obtained according to the obtained feedforward angular velocity of the motor of the first joint and the above-mentioned relation. In which, the first coordinate system refers to a plane global coordinate system with a total centroid taking an initial plane as the x axis and the normal direction of the x axis as the z axis when the humanoid robot is put on the initial plane.

The processor 41 is configured to calculate the current actual position of the centroid according to the inclination angle of the first joint, the inclination angle of the second joint, and the inclination angle of the sole, and the deviation of the centroid of the humanoid robot is calculated based on the difference between the current actual position of the centroid and a preset initial centroid position of the humanoid robot, and then a closed-loop feedback is performed on the centroid deviation of the humanoid robot through a common controller (e.g., a PID controller, a PD controller, a PI controller, or a P controller,) to obtain the feedback speed of the centroid, and finally the feedback angular velocity of the motor of the first joint and the feedback angular velocity of the motor of the second joint are determined through the product of the feedback speed of the centroid and the motion parameter of the centroid.

The processor 41 is configured to obtain a reference angular velocity of the motor of the first joint by summing the feedforward angular velocity of the motor of the first joint and the feedback angular velocity of the motor of the first joint obtained in the above-mentioned two steps (i.e., steps S13 and S14), and the reference angular velocity of the motor of the first joint is integrated, and finally the inclination angle of the first joint is obtained, which is the current inclination angle of the first joint to be transmitted to the motor of the first joint so that the motor of the first joint can perform the deviation control on the first joint according to the inclination angle of the first joint.

At the same time, by summing the feedforward angular velocity of the motor of the second joint and the feedback angular velocity of the motor of the second joint obtained in the above-mentioned two steps (i.e., steps S13 and S14), a reference angular velocity of the motor of the second joint is obtained, and the reference angular velocity of the motor of the second joint is integrated, and finally the inclination angle of the second joint is obtained, which is the current inclination angle of the second joint to be transmitted to the motor of the second joint so that the motor of the second joint can perform the deviation control on the second joint according to the inclination angle of the second joint. Finally, the motors of the two joints are controlled to perform compensation and deviation control on the two joints, and finally the humanoid robot can be restored to balance.

In the above-mentioned manner, the feedforward angular velocity of each joint motor under feedforward control is calculated first, and the feedback angular velocity of each joint motor under feedback control is calculated, and then the feedforward angular velocities and the feedback angular velocities calculated through the above-mentioned two control methods are summed and integrated, and finally the reference angles that combine the results of feedforward control and feedback control are obtained, which effectively solves the problem of response lag in feedback control and improves the control accuracy of each motor while ensuring the accuracy of centroid control, and improves the balance and anti-interference capabilities of the humanoid robot.

Figure 6:
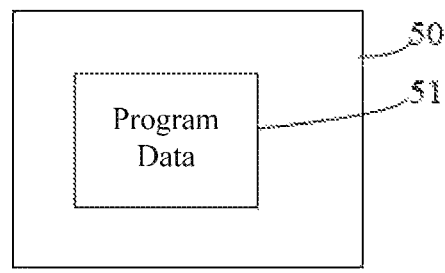
FIG. 6 is a schematic block diagram of a computer readable storage medium according to an embodiment of the present disclosure.

Based on the same inventive concept, a computer readable storage medium is further provided. FIG. 6 is a schematic block diagram of a computer readable storage medium according to an embodiment of the present disclosure. As shown in FIG. 6, a computer readable storage medium 50 is stored with program data 51, and the program data 51 is for implementing any of the above-mentioned methods. In one embodiment, the computer readable storage medium 50 includes a variety of media such as a USB disk, a mobile hard disk, a read-only memory (ROM), a random access memory (RAM), a magnetic disk, and an optical disk which is capable of storing program codes.

On the one hand, the present disclosure physically separates instruction cache and data cache from each other. The physical separation structure improves the efficiency of data obtaining and reduces the manufacturing complexity of the processor. On the other hand, logically combining the instruction cache and the data cache is equivalent to expanding the capacity of the first level cache, thereby increasing the cache hit rate.

In the embodiments provided by the present disclosure, it is to be understood that the disclosed methods and devices can be implemented in other ways. For example, the device embodiments described above are merely illustrative; the division of the modules or units is merely a division of logical functions, and can be divided in other ways such as combining or integrating multiple units or components with another system when being implemented; and some features can be ignored or not executed. In another aspect, the coupling such as direct coupling and communication connection which is shown or discussed can be implemented through some interfaces, and the indirect coupling and the communication connection between devices or units can be electrical, mechanical, or otherwise.

The units described as separated components can or cannot be physically separate, and the components shown as units can or cannot be physical units, that is, can be located in one place or distributed over a plurality of network elements. It is possible to select some or all of the units in accordance with the actual needs to achieve the object of the embodiments.

In addition, each of the functional units in each of the embodiments of the present disclosure can be integrated in one processing unit. Each unit can be physically exists alone, or two or more units can be integrated in one unit. The above-mentioned integrated unit can be implemented either in the form of hardware, or in the form of software functional units.

The integrated unit can be stored in a non-transitory computer readable storage medium if it is implemented in the form of a software functional unit and sold or utilized as a separate product. Based on this understanding, the technical solution of the present disclosure, either essentially or in part, contributes to the prior art, or all or a part of the technical solution can be embodied in the form of a software product. The software product is stored in a storage medium.

The foregoing is merely embodiments of the present disclosure, and is not intended to limit the scope of the present disclosure. Any equivalent structure or flow transformation made based on the specification and the accompanying drawings of the present disclosure, or any direct or indirect applications of the present disclosure on other related fields, shall all be covered within the protection of the present disclosure.

What is claimed is:

1. A computer-implemented control method for a humanoid robot, comprising steps of:
    obtaining a current torque of a sole of the humanoid robot, an inclination angle of the sole, an inclination angle of a first joint of the humanoid robot, and an inclination angle of a second joint of the humanoid robot;
    calculating a current feedforward angular velocity of a motor of the first joint and a current feedforward angular velocity of a motor of the second joint through the torque and the inclination angle of the sole;
    calculating a feedback angular velocity of the motor of the first joint and a feedback angular velocity of the motor of the second joint based on the inclination angle of the first joint, the inclination angle of the second joint, the inclination angle of the sole, and an initial centroid position of the humanoid robot;
    obtaining an inclination angle of the first joint based on the feedforward angular velocity of the motor of the first joint and the feedback angular velocity of the motor of the first joint, and performing, through the motor of the first joint, a deviation control on the first joint according to the inclination angle of the first joint; and
    obtaining an inclination angle of the second joint based on the feedforward angular velocity of the motor of the second joint and the feedback angular velocity of the motor of the second joint, and performing, through the motor of the second joint, a deviation control on the second joint according to the inclination angle of the second joint.

2. The method of claim 1, wherein the step of calculating the current feedforward angular velocity of the motor of the first joint and the current feedforward angular velocity of the motor of the second joint through the torque and the inclination angle of the sole comprises:
    calculating the current feedforward angular velocity of the motor of the first joint of the humanoid robot based on the torque;
    obtaining the inclination angle of the first joint and the inclination angle of the second joint at a previous moment of the humanoid robot; and
    calculating the current feedforward angular velocity of the motor of the second joint based on the current feedforward angular velocity of the motor of the first joint, the inclination angle of the sole, and the inclination angle of the first joint and the inclination angle of the second joint at the previous moment.

3. The method of claim 2, wherein the step of calculating the current feedforward angular velocity of the motor of the second joint based on the current feedforward angular velocity of the motor of the first joint, the inclination angle of the sole, and the inclination angle of the first joint and the inclination angle of the second joint at the previous moment comprises:

calculating a centroid motion parameter based on the inclination angle of the sole and the inclination angle of the first joint and the inclination angle of the second joint at the previous moment; and determining a relation between the feedforward angular velocity of the motor of the first joint and the feedforward angular velocity of the motor of the second joint based on the centroid motion parameter, the angular velocity corresponding to the inclination angle of the sole, and a coordinate parameter of a centroid of the humanoid robot in a first coordinate system.

4. The method of claim 3, wherein the step of determining the relationship between the feedforward angular velocity of the motor of the first joint and the feedforward angular velocity of the motor of the second joint based on the centroid motion parameter, the angular velocity corresponding to the inclination angle of the sole, and the coordinate parameter of the centroid of the humanoid robot in the first coordinate system comprises:

obtaining a relationship of the angular velocity corresponding to the inclination angle of the sole with respect to the feedforward angular velocity of the motor of the first joint and the feedforward angular velocity of the motor of the second joint based on the coordinate parameter of the centroid of the humanoid robot in the first coordinate system, and obtaining a relationship between the current feedforward angular velocity of the motor of the first joint and the feedforward angular velocity of the motor of the second joint using the centroid motion parameter so as to determine the feedforward angular velocity of the motor of the second joint.

5. The method of claim 1, wherein the step of calculating the feedback angular velocity of the motor of the first joint and the feedback angular velocity of the motor of the second joint based on the inclination angle of the first joint, the inclination angle of the second joint, the inclination angle of the sole, and an initial centroid position of the humanoid robot comprises:

calculating a centroid deviation of the humanoid robot based on the inclination angle of the first joint, the inclination angle of the second joint, the inclination angle of the sole, and the initial centroid position of the humanoid robot; and obtaining the feedback angular velocity of the motor of the first joint and the feedback angular velocity of the motor of the second joint based on the centroid deviation.

6. The method of claim 5, wherein the step of calculating the centroid deviation of the humanoid robot based on the inclination angle of the first joint, the inclination angle of the second joint, the inclination angle of the sole, and the initial centroid position of the humanoid robot comprises:

calculating a current position of a centroid of the humanoid robot base on the inclination angle of the first joint, the inclination angle of the second joint, and the inclination angle of the sole; and determining the centroid deviation of the humanoid robot through a difference between the current position of the centroid and the initial centroid position.

7. The method of claim 5, wherein the step of obtaining the feedback angular velocity of the motor of the first joint and the feedback angular velocity of the motor of the second joint based on the centroid deviation comprises:

determining a feedback speed of the centroid based on the centroid deviation; and determining the feedback angular velocity of the motor of the first joint and the feedback angular velocity of the motor of the second joint through a product of the feedback velocity of the centroid and the centroid motion parameter.

8. The method of claim 1, wherein the step of obtaining the inclination angle of the first joint based on the feedforward angular velocity of the motor of the first joint and the feedback angular velocity of the motor of the first joint comprises:

summing the feedforward angular velocity of the motor of the first joint and the feedback angular velocity of the motor of the first joint to obtain a reference angular velocity of the motor of the first joint, and integrating the reference angular velocity of the motor of the first joint to obtain the inclination angle of the first joint;

the step of obtaining the inclination angle of the second joint based on the feedforward angular velocity of the motor of the second joint and the feedback angular velocity of the motor of the second joint comprises:

summing the feedforward angular velocity of the motor of the second joint and the feedback angular velocity of the motor of the second joint to obtain a reference angular velocity of the motor of the second joint, and integrating the reference angular velocity of the motor of the second joint to obtain the inclination angle of the second joint.

9. A humanoid robot, comprising:

a processor;

a memory coupled to the processor; and one or more computer programs stored in the memory and executable on the processor;

wherein, the one or more computer programs comprise:

instructions for obtaining a current torque of a sole of the humanoid robot, an inclination angle of the sole, an inclination angle of a first joint of the humanoid robot, and an inclination angle of a second joint of the humanoid robot;

instructions for calculating a current feedforward angular velocity of a motor of the first joint and a current feedforward angular velocity of a motor of the second joint through the torque and the inclination angle of the sole;

instructions for calculating a feedback angular velocity of the motor of the first joint and a feedback angular velocity of the motor of the second joint based on the inclination angle of the first joint, the inclination angle of the second joint, the inclination angle of the sole, and an initial centroid position of the humanoid robot;

instructions for obtaining an inclination angle of the first joint based on the feedforward angular velocity of the motor of the first joint and the feedback angular velocity of the motor of the first joint, and performing, through the motor of the first joint, a deviation control on the first joint according to the inclination angle of the first joint; and instructions for obtaining an inclination angle of the second joint based on the feedforward angular velocity of the motor of the second joint and the feedback angular velocity of the motor of the second joint, and performing, through the motor of the second joint, a deviation control on the second joint according to the inclination angle of the second joint.

10. The robot of claim 9, wherein the instructions for calculating the current feedforward angular velocity of the motor of the first joint and the current feedforward angular velocity of the motor of the second joint through the torque and the inclination angle of the sole comprise:

instructions for calculating the current feedforward angular velocity of the motor of the first joint of the humanoid robot based on the torque;

instructions for obtaining the inclination angle of the first joint and the inclination angle of the second joint at a previous moment of the humanoid robot; and instructions for calculating the current feedforward angular velocity of the motor of the second joint based on the current feedforward angular velocity of the motor of the first joint, the inclination angle of the sole, and the inclination angle of the first joint and the inclination angle of the second joint at the previous moment.

11. The robot of claim 10, wherein the instructions for calculating the current feedforward angular velocity of the motor of the second joint based on the current feedforward angular velocity of the motor of the first joint, the inclination angle of the sole, and the inclination angle of the first joint and the inclination angle of the second joint at the previous moment comprise:

instructions for calculating a centroid motion parameter based on the inclination angle of the sole and the inclination angle of the first joint and the inclination angle of the second joint at the previous moment; and instructions for determining a relation between the feedforward angular velocity of the motor of the first joint and the feedforward angular velocity of the motor of the second joint based on the centroid motion parameter, the angular velocity corresponding to the inclination angle of the sole, and a coordinate parameter of a centroid of the humanoid robot in a first coordinate system.

12. The robot of claim 11, wherein the instructions for determining the relationship between the feedforward angular velocity of the motor of the first joint and the feedforward angular velocity of the motor of the second joint based on the centroid motion parameter, the angular velocity corresponding to the inclination angle of the sole, and the coordinate parameter of the centroid of the humanoid robot in the first coordinate system comprise:

instructions for obtaining a relationship of the angular velocity corresponding to the inclination angle of the sole with respect to the feedforward angular velocity of the motor of the first joint and the feedforward angular velocity of the motor of the second joint based on the coordinate parameter of the centroid of the humanoid robot in the first coordinate system, and obtaining a relationship between the current feedforward angular velocity of the motor of the first joint and the feedforward angular velocity of the motor of the second joint using the centroid motion parameter so as to determine the feedforward angular velocity of the motor of the second joint.

13. The robot of claim 9, wherein the instructions for calculating the feedback angular velocity of the motor of the first joint and the feedback angular velocity of the motor of the second joint based on the inclination angle of the first joint, the inclination angle of the second joint, the inclination angle of the sole, and an initial centroid position of the humanoid robot comprise:

instructions for calculating a centroid deviation of the humanoid robot based on the inclination angle of the first joint, the inclination angle of the second joint, the inclination angle of the sole, and the initial centroid position of the humanoid robot; and instructions for obtaining the feedback angular velocity of the motor of the first joint and the feedback angular velocity of the motor of the second joint based on the centroid deviation.

14. The robot of claim 13, wherein the instructions for calculating the centroid deviation of the humanoid robot based on the inclination angle of the first joint, the inclination angle of the second joint, the inclination angle of the sole, and the initial centroid position of the humanoid robot comprise:

instructions for calculating a current position of a centroid of the humanoid robot base on the inclination angle of the first joint, the inclination angle of the second joint, and the inclination angle of the sole; and instructions for determining the centroid deviation of the humanoid robot through a difference between the current position of the centroid and the initial centroid position.

15. The robot of claim 13, wherein the instructions for obtaining the feedback angular velocity of the motor of the first joint and the feedback angular velocity of the motor of the second joint based on the centroid deviation comprise:

instructions for determining a feedback speed of the centroid based on the centroid deviation; and instructions for determining the feedback angular velocity of the motor of the first joint and the feedback angular velocity of the motor of the second joint through a product of the feedback velocity of the centroid and the centroid motion parameter.

16. The robot of claim 9, wherein the instructions for obtaining the inclination angle of the first joint based on the feedforward angular velocity of the motor of the first joint and the feedback angular velocity of the motor of the first joint comprise:

instructions for summing the feedforward angular velocity of the motor of the first joint and the feedback angular velocity of the motor of the first joint to obtain a reference angular velocity of the motor of the first joint, and integrating the reference angular velocity of the motor of the first joint to obtain the inclination angle of the first joint;

the instructions for obtaining the inclination angle of the second joint based on the feedforward angular velocity of the motor of the second joint and the feedback angular velocity of the motor of the second joint comprise:

instructions for summing the feedforward angular velocity of the motor of the second joint and the feedback angular velocity of the motor of the second joint to obtain a reference angular velocity of the motor of the second joint, and integrating the reference angular velocity of the motor of the second joint to obtain the inclination angle of the second joint.

17. A non-transitory computer readable storage medium for storing one or more computer programs, wherein the one or more computer programs comprise:

instructions for obtaining a current torque of a sole of the humanoid robot, an inclination angle of the sole, an inclination angle of a first joint of the humanoid robot, and an inclination angle of a second joint of the humanoid robot;

instructions for calculating a current feedforward angular velocity of a motor of the first joint and a current feedforward angular velocity of a motor of the second joint through the torque and the inclination angle of the sole;

instructions for calculating a feedback angular velocity of the motor of the first joint and a feedback angular velocity of the motor of the second joint based on the inclination angle of the first joint, the inclination angle of the second joint, the inclination angle of the sole, and an initial centroid position of the humanoid robot;

instructions for obtaining an inclination angle of the first joint based on the feedforward angular velocity of the motor of the first joint and the feedback angular velocity of the motor of the first joint, and performing, through the motor of the first joint, a deviation control on the first joint according to the inclination angle of the first joint; and instructions for obtaining an inclination angle of the second joint based on the feedforward angular velocity of the motor of the second joint and the feedback angular velocity of the motor of the second joint, and performing, through the motor of the second joint, a deviation control on the second joint according to the inclination angle of the second joint.

18. The storage medium of claim 17, wherein the instructions for calculating the current feedforward angular velocity of the motor of the first joint and the current feedforward angular velocity of the motor of the second joint through the torque and the inclination angle of the sole comprise:

instructions for calculating the current feedforward angular velocity of the motor of the first joint of the humanoid robot based on the torque;

instructions for obtaining the inclination angle of the first joint and the inclination angle of the second joint at a previous moment of the humanoid robot; and instructions for calculating the current feedforward angular velocity of the motor of the second joint based on the current feedforward angular velocity of the motor of the first joint, the inclination angle of the sole, and the inclination angle of the first joint and the inclination angle of the second joint at the previous moment.

19. The storage medium of claim 18, wherein the instructions for calculating the current feedforward angular velocity of the motor of the second joint based on the current feedforward angular velocity of the motor of the first joint, the inclination angle of the sole, and the inclination angle of the first joint and the inclination angle of the second joint at the previous moment comprise:

instructions for calculating a centroid motion parameter based on the inclination angle of the sole and the inclination angle of the first joint and the inclination angle of the second joint at the previous moment; and instructions for determining a relation between the feedforward angular velocity of the motor of the first joint and the feedforward angular velocity of the motor of the second joint based on the centroid motion parameter, the angular velocity corresponding to the inclination angle of the sole, and a coordinate parameter of a centroid of the humanoid robot in a first coordinate system.

20. The storage medium of claim 19, wherein the instructions for determining the relationship between the feedforward angular velocity of the motor of the first joint and the feedforward angular velocity of the motor of the second joint based on the centroid motion parameter, the angular velocity corresponding to the inclination angle of the sole, and the coordinate parameter of the centroid of the humanoid robot in the first coordinate system comprise:

instructions for obtaining a relationship of the angular velocity corresponding to the inclination angle of the sole with respect to the feedforward angular velocity of the motor of the first joint and the feedforward angular velocity of the motor of the second joint based on the coordinate parameter of the centroid of the humanoid robot in the first coordinate system, and obtaining a relationship between the current feedforward angular velocity of the motor of the first joint and the feedforward angular velocity of the motor of the second joint using the centroid motion parameter so as to determine the feedforward angular velocity of the motor of the second joint.

\* \* \* \* \*